Patented July 24, 1951

2,561,333

UNITED STATES PATENT OFFICE 2,561,333

REVERSIBLE VEGETABLE GEL

Arthur C. Beckel, Peoria, and Paul A. Belter, Pekin, Ill., assignors to the United States of America as represented by the Secretary of Agriculture No Drawing. Application January 25, 1949, Serial No. 72,735

1 Claim. (Cl. 99—17)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to a vegetable gel of the reversible type derived from the proteinaceous content of soybeans, and has among its objects the provision of such a gel which contains appreciable proportions of alcohol and which is useful in food preparations, such as cocktail toppings, solidified wines, cognacs, spiritous food novelties, and the like, and to a process for preparing such a gel.

In application Serial No. 782,941, filed October 29, 1947, of Letta I. De Voss, Arthur C. Beckel, and Paul A. Belter, now Patent No. 2,495,706, of January 31, 1950, there is disclosed a process of preparing an irreversible vegetable gel.

According to this process of De Voss et al., an alcohol-extracted proteinaceous soybean residue, which is substantially devoid of alcohol-soluble matter, is prepared by treating a proteinaceous soybean material, which may be either flakes, ground soybeans, or soybeans comminuted in any other fashion, to remove the oil, such as by conventional procedures like extraction with petroleum ether, hexane, or other similar solvents. The resulting oil-free proteinaceous soybean material is then thoroughly contacted with alcohol, preferably ethyl alcohol, in a concentration of about from 50 percent to absolute alcohol, such as by washing, to remove alcohol-soluble matter.

A second method involves treating the soybean material, in any of the forms listed above, although preferably as flakes, with alcohol directly to extract the oil and any other alcohol-soluble matter present. A second alcohol washing is therefore unnecessary.

In both the above procedures, the use of alcohol has the effect of removing certain constituents, among which are those which act as antigelling factors, and which heretofore have prevented the formation of gels from proteinaceous soybean material.

Thereafter, the alcohol-extracted proteinaceous soybean residue, now substantially devoid of alcohol-soluble matter, is extracted with water to obtain a mixture of a proteinaceous material suspended in an aqueous solution of water-soluble constituents, this mixture containing at least about 10 percent solids, that is, at least about 5 percent proteinaceous matter. This mixture is allowed to stand for a period of about from one-half to one hour, after which the insoluble fibrous material is separated from the aqueous phase as by filtration or other conventional procedure.

The remaining aqueous phase may be evaporated, if desired, by conventional means, preferably by spray-drying, to produce a dry, solid, powdery gelling material. The aqueous phase itself, if it contains at least 10 percent solids, and preferably should contain from 10 to 50 percent solids, or a similar water suspension of the dried product, will form the irreversible gel upon being heated at a temperature ranging from about 150° F. to boiling and at a pH ranging from about 5.0 to 9.0.

We have discovered that aqueous suspensions of this type, which contain from 10 to 25 percent total solids, are capable of forming a reversible gel upon the addition thereto of alcohol, such as ethanol, and including alcohol-containing aqueous solutions, such as wines, cognacs, and so forth, in sufficient quantity to produce a solution containing about from 30 percent to 50 percent, by volume of alcohol, heating this solution to a temperature between 75° C. and its approximate boiling point, and cooling the heated solution to a temperature of approximately 30° C. or below whereupon a stable gel forms. This gel may be liquefied again by reheating.

This reversible gel may contain various flavorings introduced as such or introduced with the alcohol. For instance, various aqueous solutions of alcohol containing other flavoring material, such as wines, cognacs, and the like, may be used. Care must be taken, of course, to take into account the additional water added in order that the final alcoholic range be within the range of gelling. Upon chilling to temperatures of approximately 30° C. or below, a stable gel forms which may be used as such or may be whipped to form a stable whip.

The amount of alcohol, expressed with relation to the volume of water, should be within the range of about from 30 to 50 percent, the preferred range being about from 40 percent to 50 percent alcohol, by volume. The alcohol may be added directly to the aqueous extract of the alcohol-extracted proteinaceous soybean residue, or the initial water extract may be spray dried and the resulting powder subsequently redissolved in water, to which solution the alcohol may be added.

The solids in the aqueous extract solution comprise about 50 percent protein. In higher concentrations the ratio of protein to non-protein solubles of the total solids increases slightly. At 25 percent total solids in this extract solution, the protein content will be about 16 percent.

The following example illustrates preparation of the reversible gel. An aqueous extract of the alcohol-extracted proteinaceous soybean residue, or the aqueous suspension of the spray-dried powder, prepared as described above, and containing about from 10 to 25 percent total solids, is prepared. Sufficient alcohol is added so as to constitute about from 45 to 50 percent, by volume, of the resulting solution. The presence of more than 50 percent alcohol results in precipitation of some of the protein in the solution and should therefore be avoided. The solution is heated at a temperature between about 75° C. and its boiling point. It is not necessary to hold the temperature for any appreciable time, and a brief heating, for example, a minute or two, is sufficient. It is then cooled to room temperature or lower. The reversible gel usually forms at 30° C. or slightly higher. The gel is stable at lower temperature but will become liquid if reheated, and upon recooling will gel again. Of course, if these heating and cooling steps are repeated often enough, the alcohol content may be lowered below the range of reversibility.

The following example illustrates the range of alcohol content of the gels of this invention. It indicates the alcohol concentration at which the irreversible (mainly water) gel changes to the reversible gel.

An aqueous suspension was made of soybean protein in the following manner. Hexane-extracted flakes were washed with alcohol and extracted with water. In order to achieve a relatively high concentration of the aqueous suspension for the purposes of this experiment, three separate sets of freshly washed flakes were successively extracted with the same aqueous liquid. The resulting suspension contained about 25 percent total solids or about 16 percent protein. Varying amounts of ethanol, as the alcohol, were added to portions of this extract to make up suspensions varying from 0 to 50 percent ethanol, by volume. The suspensions were heated in a steam bath for periods of 5 to 10 minutes. The results are shown tabulated in column 4.

Table

| No. | Ml. suspension | Ml. alcohol | Per cent | Remarks |
|---|---|---|---|---|
| 1 | 20 | 0 | 0 | Irreversible gel. |
| 2 | 10 | 10 | 50 | Liquid hot—gelled on cooling. |
| 3 | 15 | 5 | 25 | Irreversible gel. |
| 4 | 20 | 10 | 33⅓ | Fluid hot—gelled on cooling. |
| 5 | 18 | 12 | 40 | Do. |

The transition from an irreversible gel to the reversible gel with increasing proportions of alcohol is gradual, and occurs between 30 and 40 percent, by volume, of ethanol. The preferred range is about 40 to 50 percent alcohol and 10 to 25 percent total solids in the original aqueous suspension.

This gel accommodates flavorings, seasonings, other food material, such as fruit, nuts, and the like, and may be used as the basis for a wide range of food products. It may be used with fruits and nuts or the like to make desserts. It may be whipped with or without flavoring, the alcohol may have been added in the form of a spiritous liquor in which case a product is obtained which may be considered solidified wine, cognac, or the like.

Having thus described the invention, what is claimed is:

The process comprising extracting an alcohol-extracted proteinaceous soybean residue with water to form an aqueous extract containing from about 10 to 25 percent total solids, mixing the aqueous extract with a sufficient quantity of alcohol to form a solution containing about from 30 to 50 percent alcohol, by volume, of the total water present, heating the solution to a temperature between 75° C. and boiling, and then cooling it to a temperature below about 30° C. to form a gel.

ARTHUR C. BECKEL.
PAUL A. BELTER.

REFERENCES CITED

The following references are of record in the file of this patent:

B. Monaghan-Watts, "Whipping Ability of Soybean Proteins," Industrial and Eng. Chem., Sept. 1937, pages 1009–1011.